Dec. 17, 1957    E. H. FLETCHER    2,816,422
HYDRAULIC BRAKE ACTUATOR
Filed Dec. 9, 1954    2 Sheets-Sheet 1
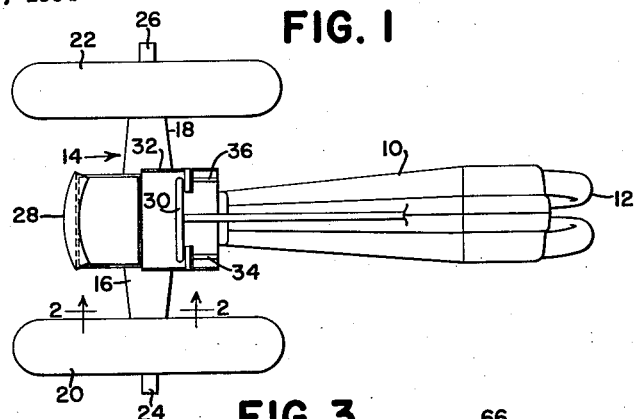
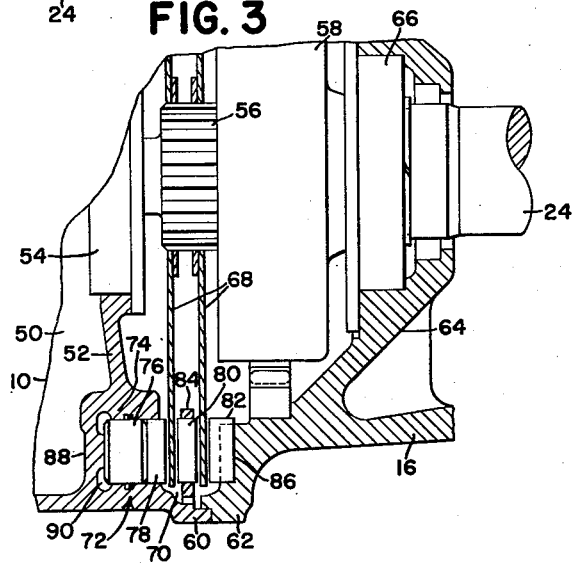
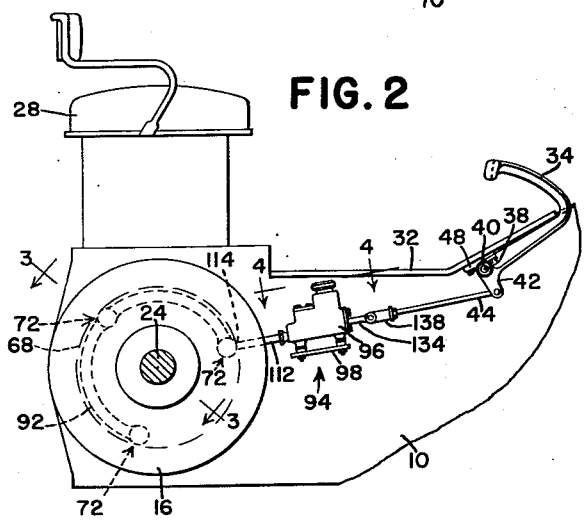
INVENTOR.
E. H. FLETCHER Dec. 17, 1957  E. H. FLETCHER  2,816,422
HYDRAULIC BRAKE ACTUATOR
Filed Dec. 9, 1954  2 Sheets-Sheet 2
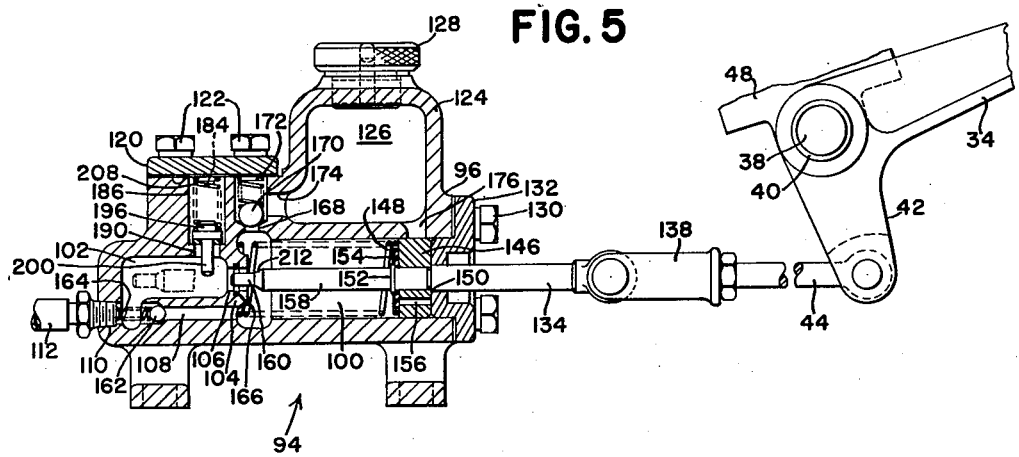
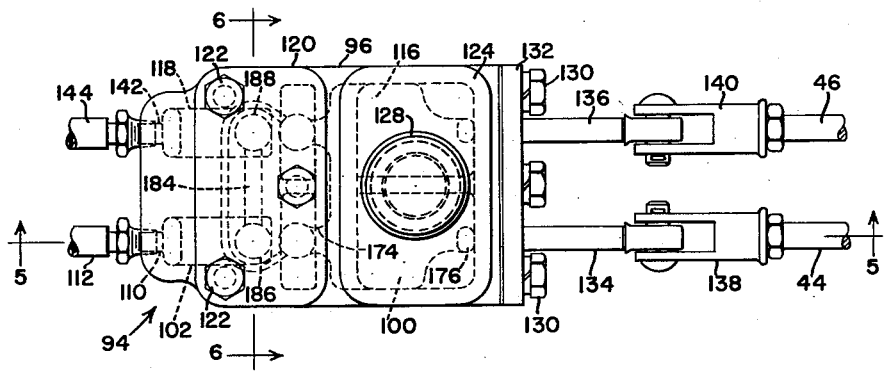
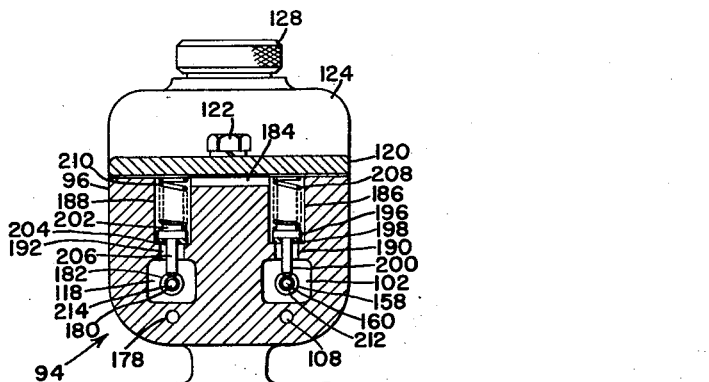
*INVENTOR.*
E. H. FLETCHER

United States Patent Office 2,816,422
Patented Dec. 17, 1957

2,816,422

HYDRAULIC BRAKE ACTUATOR

Edward H. Fletcher, Cedar Falls, Iowa, assignor to Deere Manufacturing Co., Dubuque, Iowa, a corporation of Iowa Application December 9, 1954, Serial No. 474,132

1 Claim. (Cl. 60—54.6)

This invention relates to hydraulic brake actuators and more particularly to a compound actuator and also to an actuator having an equalizer passage interconnecting dual systems.

In the application of any kind of braking means to the rear or traction wheels of an agricultural tractor, for example, the designer is always faced with the problem of providing a system in which the brakes may be either individually or simultaneously applied. The purpose of the individual application of one brake is to facilitate short-turn steering to that side. On the other hand, it is desirable that both brakes be applied simultaneously at higher tractor speeds, thus avoiding upsets and dangerous side turns. Various mechanical devices have been provided that in general accomplish a considerable measure of success along the lines indicated, and in some instances even hydraulic brakes have been utilized to great advantage. However, in the hydraulic field there are certain deficiencies that exist relative to the hydraulic interlock between the right- and left-hand brakes. According to the present invention, these deficiencies are eliminated by the provision of a pair of cylinders interconnected by an equalizer passage under the control of a pair of individual valves, one for each cylinder. The valves are arranged so that both valves must be opened before fluid pressure between the cylinders is equalized. Therefore, the depression of one of the brake pedals will transmit fluid by one of the cylinders and will affect the brakes on only that side of the tractor. Although the application of brakes on one side will open one of the equalizer valves, the other will remain closed. If the other brake is applied, the other equalizer valve will open and the equalizer passage will serve to communicate the two cylinders, thus equalizing the brakes and rendering it immaterial whether one of the pedals is depressed to a greater extent than the other.

Another feature of the invention resides in the utilization of means for compounding the movement and pressures of a piston and a plunger, the piston operating in a relatively low-pressure chamber or cylinder and functioning to take up the slack in the brake system, and the plunger operating subsequently as a displacement member in a high-pressure chamber for creating greater unit pressure in the ultimate application of the brakes. The invention features the combination of the two above features in a simple and compact housing arrangement.

The foregoing and other important objects and desirable features inherent in and encompassed by the invention will become apparent as a preferred embodiment of the invention is disclosed in detail in the following specification and accompanying sheets of drawings, the several figures of which are described immediately below.

Fig. 1 is a plan view of a representative type of agricultural tractor.

Fig. 2 is a fragmentary enlarged view, partly in section, as seen along the line 2—2 of Fig. 1.

Fig. 3 is an enlarged fragmentary view as seen along the line 3—3 of Fig. 2.

Fig. 4 is an enlarged plan view of the brake actuator as seen generally along the line 4—4 of Fig. 2.

Fig. 5 is a longitudinal section through the actuator as seen along the line 5—5 of Fig. 4.

Fig. 6 is a transverse sectional view as seen along the line 6—6 of Fig. 4.

The tractor chosen for the purposes of illustration may be taken as representative of many types of vehicles in which the particular braking system disclosed herein may be used. This tractor, as is conventional, has a longitudinal or fore-and-aft body 10 carried at its front end on a steerable wheeled truck 12 and at its rear end on a transverse axle structure 14 made up of right- and left-hand axle housings 16 and 18, respectively. Traction wheels 20 and 22 are keyed respectively to right- and left-hand axles 24 and 26 which are in turn journaled in the right- and left-hand axle housings 16 and 18.

The rear portion of the body 10 carries an operator's seat 28 ahead of which is a steering wheel 30 for the steerable wheeled truck 12. An operator's platform 32 is arranged at a level below that of the seat 28 and at the forward end of this platform are located right- and left-hand brake pedals 34 and 36.

The brake pedals are coaxially mounted by means of an inner rockshaft 38 to the left-hand end of which the left-hand pedal 36 is keyed; and a tubular rockshaft 40 is journaled on the right-hand end of the rockshaft 38 and has fixed thereto the right-hand pedal 34. Each of the pedals is in the form of a bell crank and therefore has an integral force-transmitting arm, as designated by the numeral 42 for the brake pedal 34, it being understood that a similar arm (not shown) is provided on the pedal 36. The force-transmitting arms of the pedals are connected respectively to rearwardly extending brake-actuating links 44 and 46 (Fig. 4). Suitable bearing means, as at 48, mount the coaxial rockshafts 38 and 40 on a forward portion of the operator's platform 32.

The tractor is equipped with right- and left-hand hydraulic brake mechanisms, only the right-hand one of which is shown in detail in Figs. 2 and 3. However, the presence of the left-hand mechanism in the same detail will be readily appreciated from the disclosure of the right-hand mechanism.

The rear portion of the body 10 provides a compartment 50 including a wall 52 in which is supported a bearing 54 for certain parts of drive mechanism, including a gear 56 and a drum 58 for the associated right-hand axle 24. The details of the drive mechanism are immaterial and for all practical purposes it may be assumed that the gear 56 is keyed directly to the axle 24 and therefore the axle and gear rotate together. The right-hand side of the body 10 is flanged at 60 to cooperate with a flange 62 on the inner end portion of the associated right-hand axle housing 16, which housing includes an interior wall 64 for supporting a bearing 66 coaxial with the bearing 54 and combining with that bearing for journaling the axle 24 and driving mechanism associated therewith. Here again, the details are immaterial and are merely representative.

The gear 56 has splined thereto a pair of circular plates or brake disks 68, the peripheral portions of which rotate in a channel 70 defined between the body and axle housing flanges 60 and 62. The brake disks are under the control of a plurality of fluid motors, in the present case there being three such motors and each being designated generally by the numeral 72 (Fig. 2).

Each motor comprises a cylinder 74, included in the interior body wall 52, and a piston 76 movable in the cylinder to apply compressive and retracting forces to a plurality of coaxial brake plugs 78, 80 and 82. The plug 78 is carried in the outer end of the cylinder 74; the plug 80 is carried in a ring 84, concentric with the gear 56; and the plug 82 is carried in an appropriate recess 86 in an interior portion of the associated axle housing 16. The general arrangement, as respects each motor 72, is such that expansion of the motor 72—which includes extension or movement of the piston 76 on its compression stroke—squeezes the plugs 78, 80 and 82 together, with the associated portions of the brake disks 68 therebetween. The arrangement is typical of the usual "spot" brake and, so far as the present invention is concerned, the brake mechanism per se may be of any type.

The cylinder 74 includes an end wall 88 between which and the proximate face of the piston 76 is defined an annular fluid-receivable chamber 90. The chambers 90 of the three motors 72 are interconnected by an arcuate channel 92 (Fig. 2) so that fluid is supplied simultaneously to the three motors.

The means for supplying fluid to the motors will now be described.

The hydraulic actuator is designated generally by the numeral 94 and is shown as comprising a housing 96 mounted on the right-hand side of the tractor by means of a supporting bracket 98, the details of which are substantially without particular significance.

The actuator housing 96 provides means affording a first low-pressure chamber or cylinder 100 and a first high-pressure chamber 102, these two being separated by an interior partition wall 104 of the housing. The wall 104 is apertured to provide a port 106 coaxial with the cylinder 100 and is further provided with a filling passage 108 separate from the port 106. The port and passage serve to fluid-connect the cylinder 100 and chamber 102, except when the port and passage are closed by valve means to be presently described.

The high-pressure chamber 102 has a first brake fluid supply outlet 110 to which is connected one end of a brake fluid transmitting line 112, the opposite end of which is connected at 114 to the channel 92 for the brake-applying motors 72.

The lower portion of the actuator housing 96, in which the cylinder 100 and chamber 102 are formed, has a second pair of cavities corresponding respectively to the cylinder and chamber. These are identified generally (Fig. 4) as a second cylinder 116 and a second chamber 118. The presence of the chamber 118 is somewhat more apparent in Fig. 6. The housing 96 additionally includes a cover 120, secured over the rear portion of the housing as by a plurality of cap screws 122, and an enlarged forward portion 124 within which is afforded a fluid reservoir 126 common to the cylinders 100 and 116. For all practical purposes, the housing may be considered as of one-piece construction. The reservoir is normally closed by a vented cap 128. The front end of the housing 96 has removably carried thereon, as by cap screws 130, a cover plate 132 through which slidably extend right- and left-hand piston rods 134 and 136. These rods are pivotally connected by clevises and pins 138 and 140, respectively, to the brake pedal links 44 and 46.

The left-hand high-pressure chamber 118 has a brake fluid supply outlet 142 connected by an appropriate line 144 to the left-hand brake mechanism (not shown, but the presence of which will be assumed on the basis of the disclosure of the right-hand motors 72). As will be brought out below, operation of the right- and left-hand brake systems may be independent of each other or may be simultaneous.

The piston rod 134 extends coaxially into the cylinder 100 and has fixed thereto a piston 146, normally urged to a starting position (as shown in Fig. 5) by a coil spring 148 that abuts the rear face of the piston at one end and at its other end abuts the partition wall 104. In the preferred embodiment of the invention, the piston 146 is fixed to the piston rod 134 by means of a shoulder 150 on the rod and against which the front face of the piston abuts and a snap ring 152 abutting a flapper valve 154 at the rear face of the piston. The flapper valve is suitably constructed of rubber or rubber-like material and operates to control a passage or orifice 156 that extends completely through the piston.

The piston rod 134 extends axially rearwardly as a plunger 158, the main body portion of which has a cross-sectional area substantially equal to that of the port 106 in the wall 104. The plunger further has a terminal end portion 160 which, in the starting position of the piston 146, is spaced from or in uncovering relation to the port 106, leaving the port as one of two means for fluid-interconnecting the cylinder 100 and chamber 102. The other fluid-interconnection means comprises the filling passage 108 which is under control of a first one-way valve means comprising a ball 162 biased by a spring 164 to a normal closed position. As indicated in Fig. 5, the valve 162 permits cylinder-to-chamber fluid flow at certain pressures but prevents reverse flow at any pressure.

The valving function of the plunger 158 and port 106 is improved by the use of an annular fluid seal 166 which cooperates with the cylindrical surface of the plunger 158 to establish a fluid-tight seal when the plunger passes through the port 106 as the piston 146 moves on its compression stroke from the starting position (Fig. 5) to a brake-applying position proximate to the wall or partition 104.

The extreme rearward end of the cylinder 100, just ahead of the partition wall 104, has a relief port 168 normally closed by a relief valve 170, in the form of a ball, backed up a relief valve spring 172, the ball-remote end of which abuts the undersurface of the housing cover 120 (Fig. 5). The ball 170 controls communication between the relief port 168 and a passage 174 that leads to the reservoir 126. The opposite end of the reservoir 176 communicates with the cylinder 100 via what may be termed a make-up passage 176.

From the description thus far, and ignoring what has not yet been described, and also ignoring the presence of the left-hand counterparts of those right-hand components already described, the operation of the system is as follows. When the fluid motors 72 are relaxed, thus freeing the brake disks 68 for free rotation, the brake pedal 34 will be in its relaxed or normal position and the piston 146 in the actuator 94 will be at its normal or starting position as shown in Fig. 5. When the brake pedal 34 is depressed, the force is transmitted therefrom via the arm 42, link 44, pin and clevis connection 138 to the piston rod 134, causing movement of the piston 146 to the left or on its compression stroke and toward the wall 104. During an initial minor portion of the compression stroke, the uncovered relationship between the terminal end 160 of the plunger 158 and the wall part 106 enables the transmission of fluid from the cylinder 100 to the chamber 102. Fluid flow is also permitted through the passage 108, since the pressure of the fluid from the cylinder 100 opens the return check valve 162. What is obtained during this phase of operation is relatively high speed and low-pressure operation, the chamber 102 becoming quickly filled with fluid and this fluid filling the line 112, motor-connecting channel 92 and the chambers 90 of the connected motors 72, thereby taking up the slack in the various motors and their associated "spot" plugs 78, 80 and 82. Substantially simultaneously with the taking up of slack as previously described, the body portion of the plunger 158 enters the port 106 and, because of the seal 166, functions as a valve which closes the port 106 against the transmission of further fluid between the cylinder 100 and the chamber 102. Since the pressure in the chamber 102 now becomes higher than that in the cylinder 100, the return check ball 162 closes. As the piston 146 continues on its compression stroke, the plunger 158 enters the chamber 102, as suggested in dotted lines in Fig. 5, displacing fluid therefrom. To the extent described, the only outlet for this fluid is the brake fluid supply outlet 110 and line 112. Consequently, fluid under a relatively high pressure is transmitted to the motors 72 for completing the application of the brakes; that is to say, once the slack has been taken up at relatively high speed and low pressure, the ultimate application of the brake is accomplished at higher pressure but lower speed.

After closing of the return check valve 162 and closing of the valve established by the cooperation between the plunger 158, the port 106 and the fluid seal 166, the fluid between the wall 104 and the piston 146 is carried away via opening of the relief ball 170, which enables the remaining fluid in the cylinder 100 to be transmitted to the reservoir 126, it being noted that the spring 172 behind the ball 170 is somewhat heavier than the spring 164 behind the return check ball 162, which avoids premature opening of the relief ball 170. Fluid from the reservoir 126 flows through the make-up passage 176 into the cylinder 100 at the front side of the piston 146 as the piston moves on its compression stroke. During this time such fluid at the front side of the piston cannot, of course, flow to the other side of the piston because of the presence of some fluid thereat and further because the pressure at the rear face of the piston is higher than the pressure at the front face of the piston.

If it be assumed that the maximum compression stroke of the piston 146—and consequently maximum compression or displacement stroke of the plunger 158—is used to apply the brakes, then it may further be assumed that the piston 146 at the end of its compression stroke will be proximate to the partition wall 104 and that there will be but a small quantity of fluid at the wall-proximate side of the piston and a relatively larger quantity at the other side of the piston. As the operator releases pressure on the pedal 34, to release the brakes, the piston 146 must return to its starting position. To do so, it must transmit fluid from its front face to its rear face as the spring 148 tends to move the piston 146 on its retracting stroke. Because the relief ball 170 closes, the fluid cannot be transmitted back through the reservoir and hence must pass through the make-up orifice 156 and past the flapper valve 154. Since the pressure ahead of the piston, on its retraction stroke, will be greater than the pressure behind the piston, the flapper valve will open and the fluid from the right-hand side of the piston will pass through the orifice 156 and opened flapper valve 154 to the left-hand side of the piston, which means of replenishing the cylinder 100 will obtain until the main body portion of the plunger 158 is withdrawn from the port 106. As the plunger is moving outwardly from the chamber 102, the fluid previously displaced therefrom by the plunger is being returned. If the plunger 158 were to stop just before withdrawing from the port 106, then the brake motors 72 would not be completely released, since the condition just referred to is that previously described in which slack is taken up. In other words, the brakes would be in slight engagement. Therefore, when the piston 146 moves ultimately to its starting position, the plunger 158 is withdrawn completely from the port 106, allowing the withdrawal of a sufficient amount of fluid from the chamber 102 to effect complete release of the brake so that undesirable wear does not occur.

It will be noted that as the plunger 158 is withdrawn from the port 106, a fixed volume of fluid is removed from the chamber 102. Because of this fixed amount of fluid, the relaxation of the brakes to a point at which the motors 72 are just clear of contact with the brake applying components (plugs 78, 80, and 82, and brake disks 68) does not vary even though wear occurs in the brake applying components. That is to say, as the faces of the plugs 78, 80, and 82, for example, wear, the amount of fluid required in the motors 72 will be proportionately increased. However, this increased fluid is supplied from the cylinder 100 upon the initial portion of the compression stroke of the piston 146, even though the plunger 158 closes the port 106, since it is not until the slack in the system is taken up that the return check 162 can close, because closing of this valve is responsive to the occurrence of a higher pressure in the chamber 102 than in the chamber 100. Stated otherwise, the volume of fluid in the chamber 102, fluid line 112, channel 92 and chambers 90 may vary but the fixed volume of fluid withdrawn from the chamber 102 to the chamber or cylinder 100 by withdrawal of the plunger 158 through the port 106 on the retracting stroke of the piston 146 remains fixed.

As described above, the cylinder-chamber relationship just described is duplicated in the actuator 94 for the purpose of providing the same type of control for the left-hand brake means. Also, as previously described, the left-hand cylinder 116 is associated with the left-hand high-pressure chamber 118 which in turn leads to the left-hand brake mechanism via the brake-supply outlet 142 and brake supply line 144. In Fig. 6, a filling passage 178 is visible, which passage interconnects the left-hand cylinder 116 and left-hand chamber 118. Also visible in Fig. 6 is the terminal end portion 180 of a left-hand plunger 182, the presence of which establishes the presence of a port similar to the port 106. The plunger 182 is a part of the left-hand piston rod 136, the arrangement being similar to that of the relationship between the plunger 158 and right-hand piston rod 134.

On the assumption that the right- and left-hand sides of the system are identical, it will follow that identical results in operation may be had; although, these results will be individual and exclusive of each other. Although such individuality is desired at times, simultaneous operation is desired at other times. According to the present invention, it is an important feature to provide means for achieving, selectively, individuality of operation and simultaneousness of operation, enabling individual or joint operation of the braking systems.

For the purposes of the following description, the cylinder and chamber 100 and 102 may be considered as a single chamber and the cylinder and chamber 116 and 118 may be considered as a second single chamber, the object of the invention in this respect being to provide an equalizer passage between or cross-connecting the two chambers and effective to connect or disconnect the chambers, according to the control of valve means in the equalizer passage. A representative connection by means of an equalizer passage is shown at 184, which passage has opposite or right- and left-hand ends in the form of upright bores 186 and 188 leading or communicating respectively via ports 190 and 192 to the right- and left-hand chambers 102 and 118. The bore 186 and its counterbore or port 190 serve to carry equalizer valve means in the form of a right-hand poppet valve 196 having a seat 198 of rubber or rubber-like material and a stem 200 which depends into the chamber 102 and in the path of the plunger 158.

The bore 188 and counterbore 192 at the opposite side of the actuator carry a second equalizer valve 202 having a head or seat 204 and a stem 206 that projects into the path of the plunger 182. The valves 196 and 202 are individually biased to seated positions (Fig. 6) by springs 208 and 210, respectively, which springs seat at their upper ends against the undersurface of the housing cover 120.

As seen in Fig. 5, the terminal end portion 160 of the plunger 158 has thereon means in the form of a ramp 212 for cooperative engagement with the stem 200 of the valve 196. A similar ramp, suggested at 214, for the other plunger 182 (Fig. 6) cooperates with the stem 206 of the other valve 202. The arrangement is such that when the plunger 158 enters the chamber 102 and travels to a predetermined extent therein, the ramp 212 will engage the stem 200 on the valve 196 and thus will positively open the valve. The valves 196 and 202 are so arranged that both must be opened to communicate or fluid-interconnect the chamber 118 via the equalizer passage 182. As will be brought out below in the description of the operation of this phase of the invention, opening of only one valve is an incident to operation of the piston or plunger of the associated system, which operation has no effect on the other side of the dual system.

The manner in which the right-hand brakes are applied by movement of the right-hand piston 146 on its compression stroke has been previously described, with the exception of the relationship of the port 190 as controlled by the valve 196. That port, as will be obvious, establishes a second outlet from the chamber 102 and the volumetric capacity of the bores 186 and 188 and the cross passage 184 may require consideration as part of the volume of either of the chambers 102 and 118, since pressure rise in either chamber includes opening of the associated valve. Hence, in the operation of the right-hand system so that the piston 146 moves on its compression stroke, fluid will be transmitted from the cylinder 100 to the chamber 102 via the port 106 and filling passage 108, at least until the port 106 is closed by the leading body portion of the plunger 158. As the pressure builds up in the chamber 102, it will naturally open the valve 196 and fluid getting past the valve will fill the equalizer passage 184 and fluid below the valve will fill the bore 186 and port 190. Hence, pressure rise in the chamber 102 is accompanied by pressure rise in the bore 190—186 and passage 184, as well as in the bore 188, but the head of the valve 202 is subject to this pressure which tends to increase the seat of the valve on the port 192. Therefore, the right-hand brake system may be actuated without any effect on the left-hand brake. Conversely, the left-hand brake may be operated without any effect on the right-hand brake.

In a situation in which the right-hand brake is applied and it is desired to apply the left-hand brake without relaxing pressure on the right-hand brake, the operator will merely depress the left-hand pedal, which will move the left-hand piston rod 136 to the rear, carrying with it the left-hand piston (not shown) and the left-hand plunger 182. Since the right-hand equalizer valve 196 has already been opened by the right-hand plunger 158, the two brakes will become equalized as soon as the slack is taken up in the left-hand brake; that is, as soon as the left-hand plunger 182 closes the port (not shown) that interconnects the left-hand cylinder 116 with the left-hand chamber 118. Substantially simultaneously with the closing of this port, the ramp 214 on the plunger 182 positively raises the left-hand equalizer valve 202 and completes the communication between the two chambers 102 and 118 via the equalizer passage 184 and its associated ends 186 and 188. Pressures between the chambers 102 and 118 having become equalized, the pressures throughout the system are equalized and it is immaterial that the pedals 34 and 36 are depressed in different amounts. If the manual pressure on one of the pedals—say the left-hand pedal—is removed prior to the relaxation of the manual pressure on the other pedal, the left-hand plunger 182 will be withdrawn from the left-hand chamber 118 and the displacement of the fluid will be accompanied by a closing of the valve 202, thus disconnecting the equalizer passage between the chambers 102 and 118. Again, it will be seen that the arrangement between the two chambers via the equalizer passage is such as to require the opening of both valves 196 and 202 before the passage can freely equalize pressures between the chambers.

It will be seen that the actuator is simply constructed and embodies advantageous features leading to the accomplishment of the objects originally outlined. Other features of the invention not specifically enumerated will occur to those versed in the art, as will various modifications and alterations in the preferred embodiment of the invention disclosed, all of which may be achieved without departing from the spirit and scope of the invention.

What is claimed is:

A hydraulic brake actuator, comprising: a housing having a fluid reservoir, a pressure cylinder, a fluid chamber adjacent to the cylinder, and internal wall structure transverse to and forming one end of the cylinder and separating the cylinder from the chamber, said wall structure having therethrough a port and further having therein a filling passage separate from the port and interconnecting the cylinder and the chamber, and said housing further having a brake fluid supply outlet leading from the chamber; a piston in the cylinder, having a starting position remote from the wall structure and movable on a compression stroke toward said wall structure to force fluid from the cylinder to the chamber via the port and filling passage; one-way valve means in the filling passage permitting cylinder-to-chamber flow and preventing reverse flow; a plunger connected to the piston at one end and having an opposite terminal end portion which, in the starting position of the piston, is in port-uncovering relation to the port, said plunger having a cross-sectional area such as to slidably pass through and seal the port as the piston moves on its compression stroke, said plunger, when entering the chamber, serving to increase pressure in the chamber to close the one-way valve means and to displace fluid from said chamber and through the brake fluid supply outlet; relief valve means between the cylinder and reservoir and communicating with the cylinder ahead of the piston; said relief valve means being operative to conduct fluid from the cylinder upon sealing of the port by the plunger and closing of said one-way valve means as the piston continues on its compression stroke; and means including a make-up passage between the cylinder and the reservoir behind the piston and a valved passage through the piston which closes on the compression stroke of the piston and which is operative during the return of the piston to its starting position to replenish the cylinder ahead of the piston solely from the reservoir until the terminal end portion of the plunger uncovers the port whereby additional fluid is added ahead of the piston from the chamber via said uncovered port.

References Cited in the file of this patent

UNITED STATES PATENTS

| | | |
|---|---|---|
| 1,453,098 | Frock | Apr. 24, 1923 |
| 1,990,493 | Loughead | Feb. 12, 1935 |
| 2,000,187 | Oliver | May 7, 1935 |
| 2,068,150 | Oliver | Jan. 19, 1937 |
| 2,102,834 | Carroll | Dec. 21, 1937 |
| 2,152,345 | Bowen | Mar. 28, 1939 |
| 2,291,056 | Pallady | July 28, 1942 |
| 2,347,349 | Humphrey | Apr. 25, 1944 |
| 2,374,235 | Roy | Apr. 24, 1945 |
| 2,547,233 | Seppman | Apr. 3, 1951 |
| 2,590,430 | Risse | Mar. 25, 1952 |
| 2,609,067 | Blafield | Sept. 2, 1952 |

FOREIGN PATENTS

| | | |
|---|---|---|
| 679,713 | France | Jan. 13, 1930 |